June 14, 1927.
A. V. D. WILLGOOS
1,632,526
CLUTCH
Filed April 24, 1925
Fig. 1.
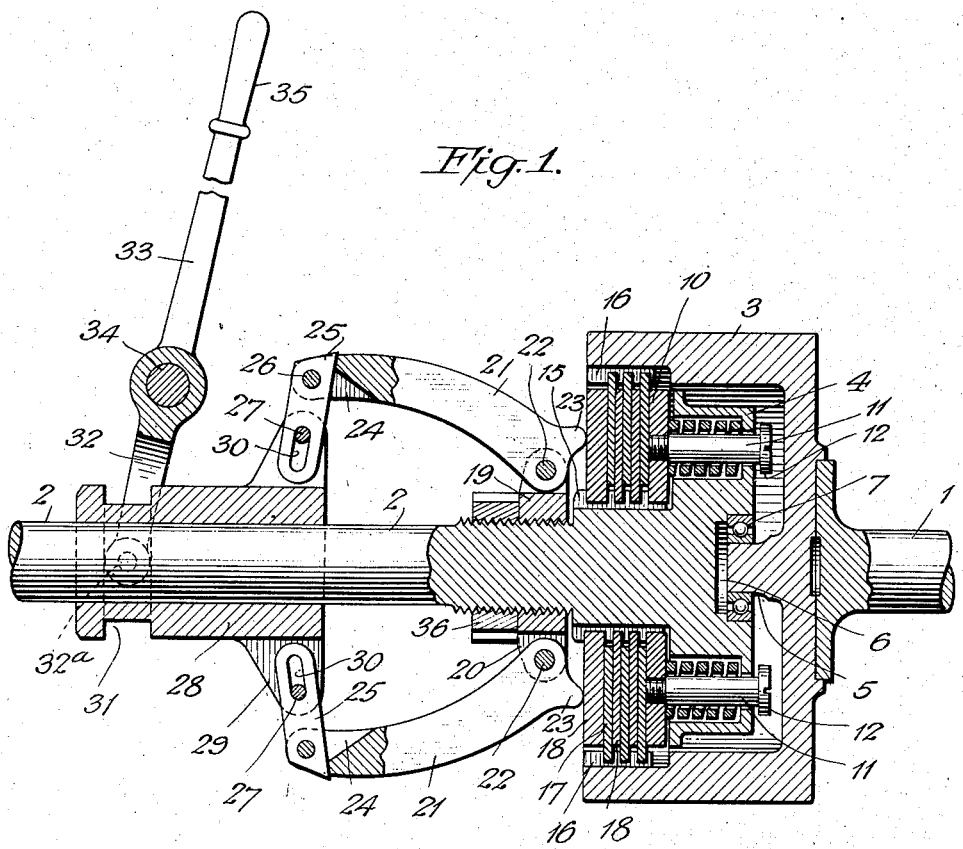
Fig. 2.
Fig. 3.
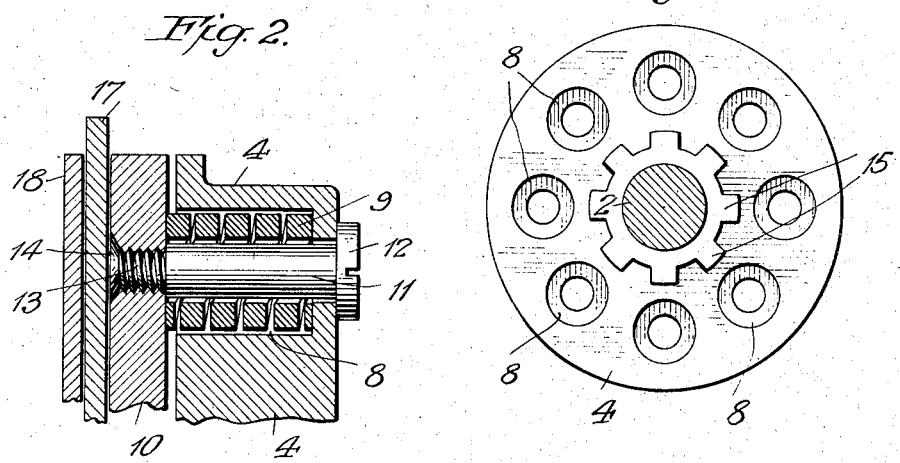
INVENTOR.
ANDREW V. D. WILLGOOS.
BY Stockbridge & Borst
ATTORNEYS.

Patented June 14, 1927.

1,632,526

UNITED STATES PATENT OFFICE.

ANDREW V. D. WILLGOOS, OF UPPER MONTCLAIR, NEW JERSEY, ASSIGNOR TO WRIGHT AERONAUTICAL CORPORATION, A CORPORATION OF NEW YORK.

CLUTCH.

Application filed April 24, 1925. Serial No. 25,499.

This invention relates to clutches, and particularly to the type known as disc or plate clutches. Such clutches are widely used for coupling internal combustion engines to parts driven thereby, as in motor boat engines, automobiles, and the like.

With clutches of this type, it has heretofore been necessary to make frequent adjustments in the operating mechanism to compensate for wear of the plates or discs, and in order to retain the desired pressure on the clutch plates or discs for any given extent of movement of the clutch operating mechanism.

An object of this invention is to provide an improved clutch of this type, with which frequent adjustments of the operating parts to obtain the desired pressure between the plates will be unnecessary; with which the pressure between the plates will remain substantially uniform over a considerable period of operation; and with which a substantially constant pressure between the clutch plates and discs will be insured within reasonably wide limits of adjustment of the clutch operating means.

A further object is to provide an improved clutch for accomplishing each and all of the above objects, which will be relatively simple, compact, durable, reliable, and inexpensive.

Various other objects and advantages will be apparent from the following description of one embodiment of the invention, and the novel features will be particularly pointed out hereinafter in connection with the appended claims.

The invention contemplates the provision of resilient buffers for the plates to insure a constant and uniform pressure between the plates when clutched, as will appear from the following description of an embodiment of the invention.

In the accompanying drawing:

Fig. 1 is a sectional elevation of a clutch device in coupled condition, constructed in accordance with the invention, and arranged for coupling two aligned shafts;

Fig. 2 is a similar sectional elevation of a portion of the same on a somewhat larger scale, with the clutch in uncoupled condition; and Fig. 3 is a sectional end view of one of the clutch elements to be coupled.

In the illustrated embodiment of the invention, a driving shaft 1 and driven shaft 2 are placed end to end with their axes of rotation aligned. The driving shaft 1 carries, upon the end adjoining the driven shaft, a cylindrical shell or fly wheel 3 which extends over in telescopic and spaced relation with the adjacent end section of the driven shaft 2. The driven shaft, at the end within the shell 3 of the driving shaft, is provided with a radial flange 4 which occupies a portion of the length of the cavity within the shell 3. The shell 3 may have an axial boss 5 extending within a recess 6 in the adjacent end of the driven shaft, so that a ball or roller bearing 7 may be interposed between them.

The radial flange 4 of the driven shaft is provided, upon its outer face, with a plurality of cavities or recesses 8, arranged in a substantially concentric row about the axis of the driven element, and in each recess or cavity a helical spring 9 is disposed, with one end of each spring projecting beyond the open end of the cavity when its other end abuts the inner end wall thereof. A plate 10 is disposed upon the driven shaft 2 for movement toward and from the flange 4 thereof. This plate 10 abuts against the outer ends of the springs 9, and concomitantly compresses all of the springs when it is forced toward the flange 4.

The plate 10 carries a plurality of studs 11 which project through the flange 4, and have heads 12 upon the projecting ends which coact with an end face of the flange 4 and limit the movement of the plate 10 away from the flange under the action of the springs 9. The springs 9 are of such a length that when the studs are provided as shown, and when the movement of the plate 10 is limited by the heads 12 as shown in Fig. 2, the springs will be under considerable initial stress or compression. This compression should be approximately that of the desired load on the plates of the clutch.

The studs 11 may be secured to the plate 10 in any suitable manner, but preferably the studs 11 have reduced threaded ends 13 which are threaded into the plate 10, and after the studs are threaded into the plate 10 their ends in the plate 10 may be riveted over as at 14 to prevent their unintentional removal. The studs may conveniently extend axially through the springs 9 as illustrated, or they may extend through separate passages in the flange 4.

The periphery of the driven shaft 2, adjacent the flange 4, is provided with one or more ribs or keys 15 which extend in a direction endwise of the driven shaft, and the overlapping section of the cylindrical shell 3 is provided with one or more similar but internal keys or ribs 16 which also extend endwise of the shafts. A plurality of clutch plates 17 and 18 are disposed upon the driven shaft over the portion within the cylindrical shell 3, a number of the plates, such as the plates 17, having notches which receive and slide along the keys or ribs 16 of the shell 3, and the remaining plates 18 having notches which slidingly receive and slide along the keys or ribs 15 of the driven shaft 2. The plates 17 and 18 will preferably be arranged alternately, so that every alternate plate will be keyed or coupled to one of said shafts and free of the other, while being capable of free sliding movement in a direction lengthwise of both of said shafts.

The clutch plates 17 and 18 are arranged to abut face to face with one another and with the plate 10, and the plate 10 may also, if desired and as illustrated, have notches or keyways slidingly receiving the keys or ribs 15 of the driven shaft, so as to serve also as one of the clutch plates. The outermost clutch plate is preferably made somewhat thicker than the others, so as to receive and transmit to the other plates, pressure from suitable operating means which will be described presently.

A collar 19 is mounted upon the driven shaft adjacent the clutch plates, and is preferably threaded thereon as shown in Fig. 1. This collar is provided with a plurality of radially disposed ears 20 to which operating levers 21 are pivoted by pins 22. These operating levers 21 have cam arms 23 which will engage with and compress the plates of the clutch, whenever the long arms of the levers 21 are moved in directions away from the shaft 2.

The free ends of the long arms of the levers 21 are provided with slots 24 in which links 25 are pivoted by pins 26, the links 25 being connected by pins 27 to an operating sleeve 28 which is slidable endwise, and rotatable upon, the driven shaft 2. The pins 27 are provided upon ears 29 of the sleeve 28, and extend through slots 30 in the links 25, which slots are preferably elongated lengthwise of the links. The elongated slots 30 provide lost motion for a movement of the sleeve 28, which lost motion may, in marine installations, be utilized to advantage in operating a reverse gear mechanism (not shown). This lost motion, however, is not essential to the present invention, and, therefore, the slots 30 may be mere bearing apertures.

The sleeve 28 is provided with an annular groove 31 which cooperates with the fork arms 32 of an operating lever 33, the lever 33 being suitably pivoted as at 34, and provided with an operating handle 35. Whenever the operating or controlling lever 33 is rocked about its pivot 34, it will shift the sleeve 28 endwise and either separate or draw toward one another the long arms of the levers 21.

A nut 36 may be threaded upon the driven shaft 2 and against the collar 19, so as to lock the latter to the shaft for rotation therewith, and the sleeve 28 and levers 21 will rotate with the driven shaft. The pins 32ᵃ on the fork arms 32, which run in the annular groove 31 of the sleeve 28, will permit of rotation of these parts with the driven shaft, while being capable of causing endwise movement of the sleeve 28 upon operation of the lever 33.

In the operation of this improved device, the assembly is made as indicated in the drawing, and the springs 9 are placed under initial compression of such value as to give the desired load on the clutch plates. This position of the parts is shown in Fig. 2 which is the free, or uncoupled, or idling condition of the clutch. In this condition of the clutch, the heads 12 of the studs 11 by their engagement with the flange 4 will limit the movement of the plate 10 in a direction away from the flange 4, and thus when the plates are released by a movement of the long arms of the levers 21 toward one another, pressure between the plates will be relieved after the studs limit movement of the plate 10. When the pressure between the plates is relieved, there will be no driving connection between the driving and driven shafts.

Let it be assumed that the shafts are to be coupled. The lever 33 will be operated in a direction to the right (Fig. 1) into the position shown in Fig. 1, and during this movement the sleeve 28 will be moved along the driven shaft 2 into the position shown in Fig. 1. During such movement it will act through the links 25 to separate the projecting long arms of the levers 21. The levers 21 will thus be rocked about their pivots 22, and carry their cam arms or projections 23 in directions to engage the pack of clutch discs or plates and force them endwise of the driven shaft and against the plate 10.

The movement of the sleeve 28 carries the inner ends of the links 25 towards the clutch member, thereby moving the ends of the levers 21 outward and forcing the clutch disc members against the abutting springs, until the links 25 reach a position substantially at right angles to the axis of the shaft, this being the point of maximum pressure of the discs against the abutting springs. A further movement of the sleeve 28 carries the links 25 past the maximum point to the position shown in Fig. 1 where the ends of the links 25 are brought to a stop against portions of the levers 21, in which position they are firmly held by the pressure transmitted through the discs and the levers 21 from the abutting springs 9.

The movement of the plate 10 will be resiliently restricted by the buffer action of the springs 9 and, therefore, the pressure between the plates will be the combined pressure upon the plate 10 by the springs 9. During a limited movement of the cam projections 23, the springs 9 will yield to allow of the continued movement of the clutch discs or plates while maintaining substantially the same uniform and constant pressure between the plates or discs, which as pointed out will be equal to the combined pressures of the springs 9.

During the compression of the springs 9 the studs 11 will move through the flange 4 and the heads 12 of the studs will move away from the flange to a limited extent as shown in Fig. 1. The coupled condition of the clutch is shown in Fig. 1. Inasmuch as part of the plates are keyed to one of the shafts and the other plates to the other shaft, the pressure between them face to face will provide sufficient friction to insure their concomitant rotation together, and therefore the driving and driven shafts will be frictionally coupled through the plates.

It will be observed that sufficient space will be left between the clutch plate 10 and the adjacent face of the flange 4, when the springs are under their initial compression, as shown in Fig. 2, to permit of a limited movement of the plate 10 and thus a compression of the springs 9 to some extent beyond their normal minimum compression. It will be observed that substantially the same pressure will be exerted upon the plates of the clutch throughout a considerable variation of movement of the operating lever and parts, and this uniform and constant pressure will be obtained for a considerable period of operation even though there may be considerable wear between the clutch plates. If, for any reason, adjustment of the pressure is desired, the nut 36 may be loosened, the collar 19 adjusted along the driven shaft in either direction as desired and for the desired extent of adjustment, after which it may be locked thereto by tightening of the nut 36 against the same. However, frequent adjustments of the nut 36 and collar 19 will be unnecessary.

While the shafts 1 and 2 have been described and referred to as the driving and driven shafts respectively, it will be understood that either shaft may be the driving element and the other the driven element.

It will be obvious that various changes in the details, which have been herein described and illustrated in order to explain the nature of the invention, may be made by those skilled in the art within the principle and scope of the invention, as expressed in the appended claims.

I claim:—

1. A clutch comprising in combination a driving shaft, a driven shaft and a coupling means therebetween, comprising a cup-shaped member having internal splines, and attached to one of said shafts, a disc member positioned within said cup-shaped member, attached to the other of said shafts, and having splines cooperating therewith, a plurality of annular friction-disc members, successive discs alternately having internal and external notch sectors, adapted to engagement with said splines, means comprising a plurality of buffer springs positioned in openings in said attached disc member, and a plurality of bolts extending through said attached disc member, cooperating with one of said friction disc members, and holding said springs under initial compression, for yieldably supporting said friction disc members, and link-lever means for frictionally engaging said friction disc members.

2. A clutch comprising in combination a driving shaft, a driven shaft and a coupling means therebetween, comprising a cup-shaped member having internal splines, and attached to one of said shafts, a disc member positioned within said cup-shaped member, attached to the other of said shafts, and having splines cooperating therewith, a plurality of annular friction disc members, successive discs alternately having internal and external notch sectors, adapted to engagement with said splines, means comprising a plurality of buffer springs positioned in openings in said attached disc member, and a plurality of bolts extending through said attached disc member, cooperating with one of said friction disc members, and holding said springs under initial compression, for yieldably supporting said friction disc members, and link-lever means for frictionally engaging said friction disc members, comprising a collar attached to said second mentioned shaft and having pivots thereon, a plurality of bell crank levers pivoted in said collar member, one end of each thereof being adapted to engage said friction disc members, a sliding sleeve surrounding said second mentioned shaft, means for controlling the movement of said collar, and a plurality of links cooperating between said bell crank levers and said collar, and means comprising stops interacting between said links and said levers whereby said collar and links may be carried slightly beyond a midpoint and held there by the pressure of said buffer springs.

3. In a friction clutch, friction surfaces, means for the positive engagement thereof, comprising levers and links, and a manually movable collar cooperating therewith, spring buffer means cooperating with said friction surfaces and adapted to movement to a greater extent than that required for positive engagement, and means comprising interacting stops between said links and said levers, adapted to arrest the movement of said links and collar at a point slightly beyond the midpoint thereof, whereby a substantial pressure against the operation of said spring buffer means is required to begin the disengagement of said friction surfaces.

4. In combination, a source of power having a shaft, an annular fly-wheel attached thereto, a driven shaft cooperating therewith, and a coupling means therebetween comprising a plurality of splines within said annular fly-wheel, a plurality of splines upon said driven shaft, a plurality of friction discs positioned therebetween and having alternate interior and exterior notched sectors respectively engaging with splines upon said shaft and within said fly-wheel, a spring abutment for said friction discs and means for holding said spring abutment under initial compression, means comprising a plurality of links and levers for applying pressure to said friction discs, and moving them against the pressure of said spring abutment, and a stop on said link and lever means, whereby actuation of said links and levers moves said friction discs against said spring abutment through a maximum point in said levers, said stop being adapted to limit the movement past said reversal point to an amount insufficient to reduce the pressure on said discs.

5. In a friction clutch, friction surfaces, means for the positive engagement thereof, comprising levers and links, and a manually movable collar cooperating therewith, spring buffer means cooperating with said friction surfaces and adapted to movement to a greater extent than that required for positive engagement, and means comprising interacting stops between said links and said levers, said levers and links having a high point, adapted to produce maximum pressure on, and movement of, said friction surfaces, against said spring buffer means, said spring buffer means being adapted to hold said levers and links against said stops, in the engaged position of said clutch.

In witness whereof, I hereunto subscribe my signature.

ANDREW V. D. WILLGOOS.